US010865291B2

(12) United States Patent
Demeter et al.

(10) Patent No.: US 10,865,291 B2
(45) Date of Patent: *Dec. 15, 2020

(54) RUBBER COMPOSITIONS CONTAINING VISCOSITY MODIFIER AND RELATED METHODS

(71) Applicant: Bridgestone Americas Tire Operations, LLC, Nashville, TN (US)

(72) Inventors: Emily W. Demeter, Aiken, SC (US); Michael P. Singleton, Evans, GA (US); Amy M. Randall, Brentwood, TN (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/686,658

(22) Filed: Nov. 18, 2019

(65) Prior Publication Data

US 2020/0079934 A1 Mar. 12, 2020

Related U.S. Application Data

(63) Continuation of application No. 15/735,497, filed as application No. PCT/US2016/035019 on May 31, 2016, now Pat. No. 10,479,881.

(60) Provisional application No. 62/173,982, filed on Jun. 11, 2015.

(51) Int. Cl.
C08L 7/00 (2006.01)
B60C 1/00 (2006.01)
C08L 101/00 (2006.01)
C08L 9/00 (2006.01)
C08K 3/04 (2006.01)
C08K 3/36 (2006.01)
C08L 9/06 (2006.01)
C08L 23/16 (2006.01)
C08L 23/22 (2006.01)
C08L 91/00 (2006.01)
C08K 3/22 (2006.01)

(52) U.S. Cl.
CPC .............. C08L 7/00 (2013.01); B60C 1/00 (2013.01); B60C 1/0016 (2013.01); C08K 3/04 (2013.01); C08K 3/36 (2013.01); C08L 9/00 (2013.01); C08L 9/06 (2013.01); C08L 23/16 (2013.01); C08L 23/22 (2013.01); C08L 101/00 (2013.01); C08K 2003/2296 (2013.01); C08K 2201/014 (2013.01); C08L 91/00 (2013.01); C08L 2310/00 (2013.01)

(58) Field of Classification Search
CPC .. C08L 7/00; C08L 21/00; C08L 23/22; C08L 23/16; C08L 9/06; C08L 9/00; C08L 101/00; C08L 23/00; C08L 91/00; C08L 2310/10; B60C 1/00; B60C 1/0016; C08K 3/36; C08K 3/04; C08K 2003/2296; C08K 2201/014

See application file for complete search history.

(56) References Cited

U.S. PATENT DOCUMENTS

| | | |
|---|---|---|
| 4,161,452 A | 7/1979 | Stambaugh et al. |
| 4,505,834 A | 3/1985 | Papay et al. |
| 4,693,838 A | 9/1987 | Varma et al. |
| 5,068,047 A | 11/1991 | Chung et al. |
| 5,523,008 A | 6/1996 | Boden et al. |
| 5,614,580 A | 3/1997 | Zanzig et al. |
| 6,465,560 B1 | 10/2002 | Zanzig et al. |
| 6,596,673 B1 | 7/2003 | Bovington et al. |
| 7,018,962 B2 | 3/2006 | Bloch et al. |
| 7,105,601 B2 | 9/2006 | Guo et al. |
| 8,222,471 B2 | 7/2012 | Elomari et al. |
| 8,241,446 B2 | 8/2012 | Naipawer, III et al. |
| 8,772,211 B2 | 7/2014 | Kelley et al. |
| 8,852,718 B2 | 10/2014 | Malboeuf et al. |
| 8,999,907 B2 | 4/2015 | Datta et al. |
| 10,138,351 B2 | 11/2018 | Randall et al. |
| 10,179,479 B2 | 1/2019 | Boley et al. |
| 10,479,881 B2 * | 11/2019 | Welles et al. ............. C08L 9/06 |
| 2003/0119682 A1 | 6/2003 | Saini et al. |
| 2004/0054065 A1 | 3/2004 | Zanzig et al. |
| 2009/0111936 A1 | 4/2009 | Wedlock |
| 2009/0186965 A1 | 7/2009 | Rodgers et al. |
| 2011/0282113 A1 | 11/2011 | Fisher et al. |
| 2012/0090720 A1 | 4/2012 | Burrowes et al. |
| 2013/0087953 A1 | 4/2013 | Rodgers et al. |
| 2013/0281590 A1 | 10/2013 | Lin et al. |

(Continued)

FOREIGN PATENT DOCUMENTS

| | | |
|---|---|---|
| CN | 101082012 A | 12/2007 |
| CN | 101880586 B | 11/2010 |
| CN | 102776054 A | 11/2012 |
| CN | 103382275 A | 11/2013 |
| CN | 102031182 B | 12/2013 |
| EP | 1195427 A2 | 4/2002 |
| EP | 0637611 B1 | 10/2003 |

(Continued)

OTHER PUBLICATIONS

International Search Report from application No. PCT/US2016/035019, 4 pages, dated Aug. 24, 2016.

(Continued)

Primary Examiner — Nathan M Nutter
(74) Attorney, Agent, or Firm — Meredith E. Hooker; Jenny L. Sheaffer

(57) ABSTRACT

Disclosed herein are rubber compositions containing a viscosity modifier and related methods such as for preparing a rubber composition containing a viscosity modifier. The viscosity modifier is an olefin copolymer and may be utilized in a neat or in an oil-extended form. Use of the olefin copolymer viscosity modifier can improve both high and low temperature E' of the rubber composition.

22 Claims, No Drawings

(56) References Cited

U.S. PATENT DOCUMENTS

| | | |
|---|---|---|
| 2014/0031269 A1 | 1/2014 | Price et al. |
| 2014/0038872 A1 | 2/2014 | Deckman et al. |
| 2015/0203784 A1 | 7/2015 | Barton et al. |
| 2015/0307807 A1 | 10/2015 | Scherer et al. |
| 2016/0229998 A1 | 8/2016 | Hough et al. |

FOREIGN PATENT DOCUMENTS

| | | |
|---|---|---|
| KR | 20020064038 A | 8/2002 |
| KR | 20110051852 A | 5/2011 |
| WO | 2001049761 A1 | 4/2002 |
| WO | 2002083826 A1 | 4/2002 |
| WO | 2012015576 A1 | 2/2012 |

OTHER PUBLICATIONS

International Preliminary Report on Patentability and Written Opinion from application No. PCT/US2016/035019, 9 pages, dated Dec. 12, 2017.
Rudnick, Leslie R., editor, Lubricant Additives. Chemistry and Applications, 2nd edition, copyright 2009 CRC Press, Taylor & Francis Group LLC, Chapter 10, Olefin Copolymer Viscosity Modifiers by Michael J. Covitch (pp. 283-314).

\* cited by examiner

RUBBER COMPOSITIONS CONTAINING VISCOSITY MODIFIER AND RELATED METHODS

CROSS-REFERENCE TO RELATED APPLICATION

This application is a continuation of U.S. application Ser. No. 15/735,497 filed Dec. 11, 2017 which claims priority to and benefit of PCT Application No. PCT/US2016/035019 filed May 31, 2016 which claims priority to and any other benefit of U.S. Provisional Patent Application Ser. No. 62/173,982, filed Jun. 11, 2015, and entitled "Rubber Compositions Containing Viscosity Modifier And Related Methods," the entire disclosure of which is hereby incorporated by reference.

FIELD

The present application is directed to rubber compositions containing a viscosity modifier and to related methods such as for preparing a rubber composition containing a viscosity modifier.

BACKGROUND

Viscosity modifiers are a type of compound frequently added to lubricating oils such as are used in engines. As its name implies, when added to a lubricating oil a viscosity modifier impacts the viscosity of the lubricating oil such as by decreasing the magnitude of the thinning that normally occurs at higher temperatures, decreasing the magnitude of the thickening that normally occurs at lower temperatures, or a combination of both.

SUMMARY

Disclosed herein are rubber compositions containing a viscosity modifier and related methods such as for preparing a rubber composition containing a viscosity modifier.

In a first embodiment, a rubber composition comprising: (a) 100 parts of at least one rubber, (b) at least one olefin copolymer viscosity modifier, (c) at least one reinforcing filler in an amount of 5 to 200 phr, and (d) a cure package is provided.

In a second embodiment, a method for preparing a rubber composition is provided. The method comprises combining (a) 100 parts of at least one rubber, (b) at least one olefin copolymer viscosity modifier, (c) at least one reinforcing filler in an amount of 5 to 200 phr, and (d) a cure package.

DETAILED DESCRIPTION

Disclosed herein are rubber compositions containing a viscosity modifier and related methods such as for preparing a rubber composition containing a viscosity modifier.

In a first embodiment, a rubber composition comprising: (a) 100 parts of at least one rubber, (b) at least one olefin copolymer viscosity modifier, (c) at least one reinforcing filler in an amount of 5 to 200 phr, and (d) a cure package is provided.

In a second embodiment, a method for preparing a rubber composition is provided. The method comprises combining (a) 100 parts of at least one rubber, (b) at least one olefin copolymer viscosity modifier, (c) at least one reinforcing filler in an amount of 5 to 200 phr, and (d) a cure package.

Definitions

The terminology as set forth herein is for description of the embodiments only and should not be construed as limiting the invention as a whole.

As used herein, the term "alpha olefin" or "α-olefin" means an olefin having a double bond at the primary or alpha (α) position.

As used herein, the term "copolymer" means a polymer having two or more monomers.

As used herein, the term "olefin" means a hydrocarbon compound having at least one double bond.

As used herein, the term "phr" means parts per one hundred parts rubber.

As used herein, the term "polybutadiene" is used to indicate a polymer that is manufactured from cis-1,3-butadiene monomers. The term polybutadiene is also used interchangeably with the phrase "polybutadiene rubber" and the abbreviation "BR."

As used herein, the term "polyisoprene" means synthetic polyisoprene. In other words, the term is used to indicate a polymer that is manufactured from isoprene monomers, and should not be construed as including naturally occurring natural rubber (e.g., Hevea natural rubber, guayule-sourced natural rubber or dandelion-sourced natural rubber). The term polyisoprene is also used interchangeably with the phrase "polyisoprene rubber" and the abbreviation "IR."

As used herein, the term "styrene-butadiene rubber" or "SBR" means a copolymer manufactured from styrene and cis-1,3-butadiene monomers.

As used herein, the term "natural rubber" or "NR" means naturally occurring rubber such as can be harvested from sources such as Hevea rubber trees, and non-Hevea source (e.g., guayule shrubs, and dandelions (e.g., TKS)). In other words, the term "natural rubber" should not be construed as including polyisoprene.

For the purpose of this disclosure, any reference to a percent amount of a component in the rubber composition means a percent by weight, unless otherwise specified. Similarly, any reference to ratios of component amounts in the rubber composition means the ratios by weight, unless otherwise specified.

Olefin Copolymer Viscosity Modifier

As discussed above, according to the first and second embodiments, the rubber composition comprises a viscosity modifier compound, more specifically at least one olefin copolymer viscosity modifier. According to the first and second embodiments, one or more than one olefin copolymer viscosity modifier can be used in the rubber composition. The total amount of the at least one olefin copolymer viscosity modifier can vary depending upon various factors including the other ingredients utilized in the rubber composition (e.g., type(s) of rubber, reinforcing filler(s), etc.), the structure of the viscosity modifier(s), and the desired properties of the rubber composition. In certain embodiments of the first and second embodiments, the rubber composition comprises 0.5 to 10 phr (in total) of the at least one olefin copolymer viscosity modifier (e.g., 0.5 phr, 1 phr, 2 phr, 3 phr, 4 phr, 5 phr, 6 phr, 7 phr, 8 phr, 9 phr, 10 phr). In other embodiments of the first and second embodiments, the rubber composition comprises 1 to 5 phr (in total) of the at least one olefin copolymer viscosity modifier (e.g., 1 phr, 2 phr, 3 phr, 4 phr, 5 phr).

While the particular structure of the at least one olefin copolymer viscosity modifier may vary, the general structure comprises a copolymer of ethylene and at least one other olefin. Non-limiting examples of the other olefin include alpha-olefins having 3 to 20 carbon atoms), including, but not limited to, propylene, butene (1-butene), hexene (1-hexene), octane (1-octene), and mixtures thereof. In certain embodiments of the first and second embodiments disclosed herein, the at least one olefin copolymer viscosity modifier comprises a copolymer of ethylene and an alpha-olefin having 3 to 20 carbon atoms, 4 to 12 carbon atoms, or 3 to 6 carbon atoms (which alpha-olefin may be linear or branched). In certain embodiments of the first and second embodiments disclosed herein, the at least one olefin copolymer comprises a copolymer of ethylene and propylene. According to the foregoing embodiments of the first and second embodiments, the relative amount of ethylene in an olefin copolymer viscosity modifier can vary. In certain embodiments of the first and second embodiments, the olefin copolymer viscosity modifier comprises 20-90% ethylene content on a mass basis (e.g., 20%, 25%, 30%, 35%, 40%, 45%, 50%, 55%, 60%, 65%, 70%, 75%, 80%, 85%, 90%), including 20-85%, 20-80%, 20-75%, 25-90%, 25-85%, 25-80%, 25-75%, 30-90%, 30-85%, 30-80%, 30-75%. Relatively higher amounts of ethylene monomer (e.g., above about 60%) in the ethylene-alpha olefin copolymer often lead to a crystalline structure for the copolymer. Relatively lower amounts of ethylene monomer (e.g., from about 25% up to 60%) in the ethylene-alpha olefin copolymer often lead to amorphous or substantially amorphous structure for the copolymer. The ethylene content in an ethylene-propylene copolymer can be measured by ASTM-D3900 and the ethylene content in copolymers with other alpha-olefins can be measured using proton and carbon-13 NMR.

The molecular weight of the at least one olefin copolymer viscosity modifier useful in the rubber compositions of the first and second embodiments can vary. In certain embodiments of the first and second embodiments, the rubber composition comprises an olefin copolymer viscosity modifier having a number average molecular weight (Mn) of 2,000 to 1,000,000 grams/mole (e.g., 20,000, 50,000, 100,000, 150,000, 200,000, 250,000, 300,000, 500,000 and 750,000), including 10,000 to 750,000, 20,000 to 500,000, and 20,000 to 250,000. The foregoing Mn values refer to the number average molecular weight as determined by Gel Permeation Chromatography ("GPC") with a polystyrene standard. Moreover, the foregoing Mn values should be understood as including Mn values for ethylene-alpha olefin copolymer viscosity modifiers including, but not limited to, ethylene-propylene copolymer viscosity modifiers.

In certain embodiments of the first and second embodiments disclosed herein, the at least one olefin copolymer viscosity modifier further comprises at least one additional polymerizable monomer non-limiting examples of which include non-conjugated polyenes (also described as dienes). Non-limiting examples of non-conjugated polyenes (non-conjugated dienes) suitable for use as the at least one additional polymerizable monomer in the olefin copolymer viscosity modifier include: (1) straight chain acyclic dienes (e.g., 1,4-hexadiene, 1,6-octadiene, and combinations thereof), (2) branched chain acyclic dienes (e.g., 5-methyl-1,4-hexadiene; 3,7-dimethyl-1,6-octadiene; 3,7-dimethyl-1,7-octadiene; mixed isomers of dihydromycene and dihydroocinene; and combinations thereof), (3) single ring alicyclic dienes (e.g., 1,4-cyclohexadiene; 1-5-cyclooctadiene; 1,5-cyclodecadiene; cyclopentadiene; and combinations thereof), (4) multi-ring alicyclic fused and bridged ring dienes (e.g., tetrahydroindene; methyltetrahydroindene; dicyclopentadiene; bicycle-(2,2,1)-hepta-2,5-diene; alkenyl, alkylidene, cycloalkenyl and cycloalkylidene norbornenes such as 5-methylene-2-norbornene, 5-ethylidene-2-norbornene, 5-propylene-2-norbornene, 5-isopropylidene-2-norborene, 5-(4-cyclopentenyl)-2-norbornene, and 5-cyclohexylidene-2-norbornene; and combinations thereof), (5) cycloalkenyl-substituted alkenes (e.g., vinyl cyclohexene, allyl cyclohexene, vinyl cyclooctene, 4-vinyl cyclohexene, allyl cyclodecene, vinyl cyclododecene, and combinations thereof, and (6) combinations of one or more compounds selected from one or more of (1)-(5). The foregoing additional polymerizable monomers should be understood as suitable choices for those embodiments of the first and second embodiments that include at least one additional polymerizable monomer within an ethylene-alpha olefin copolymer viscosity modifier structure including, but not limited to, ethylene-propylene copolymer viscosity modifiers).

In certain embodiments of the first and second embodiments, the rubber composition further comprises (includes) at least one additional viscosity modifier (i.e., in addition to the at least one olefin copolymer viscosity modifier described above). When utilized, the amount of any additional viscosity modifier may vary widely, exemplary amounts being 0.1 to 10 phr, including 0.5 to 10 phr, 0.5 to 5 phr and 1 to 5 phr. The at least one additional viscosity modifier may be of a type other than an olefin copolymer such as a polar ester type viscosity modifier (e.g., a long chain ester of maleic anhydride and styrene copolymer, a long chain ester of poly(alkyl)acrylate copolymer such as poly(meth)acrylate copolymer, or a combination thereof). In other embodiments of the first and second embodiments, the rubber composition does not include (i.e., excludes, is free of, or comprises 0 phr of) any viscosity modifier other than the at least one olefin copolymer viscosity modifier described above.

In certain embodiments of the first and second embodiments, the at least one olefin copolymer viscosity modifier is combined with the ingredients in a form that includes at least one oil (e.g., in a concentrate form) prior to being added to the rubber composition; one or more than one oil may be utilized in such embodiments. Such forms may also be referred to as oil-extended viscosity modifiers. In other embodiments of the first and second embodiments, the at least one olefin copolymer viscosity modifier is combined with the ingredients in a "neat" form (i.e., the at least one olefin copolymer viscosity modifier without any diluent or solvent such as oil); such a form may also be referred to as non-oil-extended viscosity modifier. In those embodiments of the first and second embodiments where the at least one olefin viscosity modifier is in a non-oil-extended form (prior to being added to the rubber composition) it may take various forms including, but not limited to, a crystalline solid, pellets, and bales; in those embodiments where the non-oil-extended olefin viscosity modifier is provided in a larger form (e.g., bales) it is preferably ground or otherwise reduced in size prior to adding to the rubber composition. In those embodiments of the first and second embodiments where the at least one olefin copolymer viscosity modifier is provided in a form that includes at least one oil, the composition of the at least one oil may vary. In certain such embodiments, the at least one oil comprises at least one of: petroleum oil (e.g., aromatic oil, naphthenic oil, paraffinic oil, low PCA oil) or plant-based oil (e.g., vegetable oil, nut oil, seed oil). The at least one oil can comprises one or more than one of the foregoing types, including one or more than one oil of each type. Further details on the foregoing oils are provided below. When the at least one olefin copolymer viscosity modifier is provided in a form that includes at least one oil, the concentration of the viscosity modifier in the oil may vary depending upon various factors such as the concentration of the viscosity modifier in the oil; in certain embodiments, the oil containing the at least one viscosity modifier comprises 5-30% by weight (in total) of the at least one viscosity modifier, including 5-25% by weight (in total), 5-20% by weight (in total), and 5-15% by weight (in total). In certain embodiments of the first and second embodiments, the oil-extended viscosity modifier is utilized in an amount of 5-40 phr (e.g., 5 phr, 10 phr, 15 phr, 20 phr, 25 phr, 30 phr, 35 phr, and 40 phr as well as amounts), including 5-30 phr, and 5-25 phr (with the foregoing amounts referring to the amount of viscosity modifier and oil).

There are various olefin copolymer viscosity modifiers that are commercially available and suitable for use in the rubber compositions of certain embodiments of the first and second embodiments disclosed herein. Non-limiting examples of such commercially available olefin copolymer viscosity modifiers include, but are not limited to, those sold by Dow Chemical Company under their Nordel™ IP and Nordel™ MG brands (ethylene-propylene-diene-monomer copolymers), those sold by DSM Elastomers under their Keltan® EP(D)M brand (ethylene-propylene copolymers and ethylene-propylene-diene-monomer copolymers), those sold by ExxonMobil Chemical Company under their Vistalon™ brand (ethylene-propylene copolymers and ethylene-propylene-diene-monomer copolymers), those sold by JSR Corporation under their Esprene® brand (ethylene-propylene copolymers and ethylene-propylene-diene-monomer copolymers), those sold by Lanxess Buna GmbH or Lanxess Buna LLC under their Buna® EP T and Buna® EP G brands (ethylene-propylene copolymers and ethylene-propylene-diene-monomer copolymers), those sold by Lion Copolymer Geismar, LLC under their Royalene® and Trilene® brands (ethylene-propylene copolymers and ethylene-propylene-diene-monomer copolymers), those sold by Mitsui Chemicals under their Mitsui EPT™ brand (ethylene-propylene copolymers and ethylene-propylene-diene-monomer copolymers), those sold by Polimeri Europa under their Dutral® brand (ethylene-propylene copolymers and ethylene-propylene-diene-monomer copolymers), those sold by Sumitomo Chemical Co., Ltd. under their Esprene® brand (ethylene-propylene-diene-monomer copolymers, those available from Afton Chemical Corporation under their Hitec® brand (ethylene-propylene copolymers and ethylene-propylene-diene-monomer copolymers), those available from Chevron Oronite Company, LLC under their Paratone® brand (ethylene-propylene copolymers and ethylene-propylene-diene-monomer copolymers), those available from Infineum under their Infineum V500™ brand (ethylene-propylene copolymers and ethylene-propylene-diene-monomer copolymers), those available from The Lubrizol Corporation (ethylene-propylene copolymers and ethylene-propylene-diene-monomer copolymers), and those available from Evonik Industries under their Viscoplex® brand (ethylene-propylene copolymers and ethylene-propylene-diene-monomer copolymers). Various of the foregoing olefin copolymer viscosity modifiers are available in oil-extended or non-oil-extended forms.

Rubber

As discussed above, according to the first and second embodiments, the rubber composition comprises at least one rubber. These rubber compositions can be understood as comprising 100 parts of at least one rubber (which can alternatively be expressed as 100 phr). The at least one rubber can be selected from natural rubber, synthetic rubber, or combinations thereof. Suitable rubbers for use in the rubber composition are well known to those skilled in the art and include but are not limited to the following: synthetic polyisoprene rubber, natural rubber, styrene-butadiene rubber (SBR), styrene-isoprene rubber, butadiene-isoprene-rubber, styrene-isoprene-butadiene rubber, polybutadiene, butyl rubber (both halogenated and non-halogenated), neoprene (polychloroprene), acrylonitrile-butadiene rubber (NBR), silicone rubber, fluorinated rubber, polyacrylate rubber (copolymer of acrylate monomer and vinyl ether), ethylene acrylic rubber, ethylene vinyl acetate copolymer (EVA), epichlorohydrin rubbers, chlorinated polyethylene rubbers, chlorosulfonated polyethylene rubbers, nitrile rubber, halogenated nitrile rubber, hydrogenated nitrile rubber, and tetrafluoroethylene-propylene rubber. Examples of fluorinated rubber include perfluoroelastomer rubber, fluoroelastomer, fluorosilicone, and tetrafluoroethylene-propylene rubber.

In certain embodiments of the first and second embodiments disclosed herein, the rubber composition is formulated such that at least a majority (by weight) of the at least one rubber comprises at least one of: natural rubber, polyisoprene rubber, polybutadiene rubber, and styrene-butadiene rubber; in such embodiments, one or more than one type of any of the foregoing rubbers can be utilized and one or more than one of each type can also be utilized. In certain embodiments, at least 60% by weight (at least 60 parts or phr), at least 70% by weight (at least 70 parts or phr), at least 80% by weight (at least 80 parts or phr), at least 90% by weight (at least 90 parts or phr), at least 95% by weight (at least 95 parts phr), or even 100% by weight (100 parts or phr) of the rubber comprises at least one of: natural rubber, synthetic polyisoprene rubber, polybutadiene rubber, and styrene-butadiene rubber.

In certain embodiments of the first and second embodiments disclosed herein, the rubber composition is formulated such that at least a majority (by weight) of the at least one rubber comprises at least one of: natural rubber, polyisoprene rubber, polybutadiene rubber, and styrene-butadiene rubber; in such embodiments, one or more than one type of any of the foregoing rubbers can be utilized and one or more than one of each type can also be utilized. In certain embodiments, at least 60% by weight (at least 60 parts or phr), at least 70% by weight (at least 70 parts or phr), at least 80% by weight (at least 80 parts or phr), at least 90% by weight (at least 90 parts or phr), at least 95% by weight (at least 95 parts phr), or even 100% by weight (100 parts or phr) of the rubber comprises at least one of: natural rubber, synthetic polyisoprene rubber, polybutadiene rubber, and styrene-butadiene rubber.

In certain embodiments of the first and second embodiments disclosed herein, the rubber composition is formulated such that all 100 parts (100 phr) of the rubber in the composition comprises at least one of: synthetic polyisoprene rubber, natural rubber, styrene-butadiene rubber, styrene-isoprene rubber, butadiene-isoprene rubber, styrene-isoprene-butadiene rubber, polybutadiene, or butyl rubber (halogenated, non-halogenated, or both).

In certain embodiments of the first and second embodiments disclosed herein, the rubber composition is formulated such that a minority (by weight) of the at least one rubber comprises at least one of: styrene-isoprene rubber, butadiene-isoprene-rubber, styrene-isoprene-butadiene rubber, butyl rubber (both halogenated and non-halogenated), neoprene (polychloroprene), acrylonitrile-butadiene rubber (NBR), silicone rubber, fluorinated rubber, polyacrylate rubber (copolymer of acrylate monomer and vinyl ether), ethylene acrylic rubber, ethylene vinyl acetate copolymer (EVA), epichlorohydrin rubbers, chlorinated polyethylene rubbers, chlorosulfonated polyethylene rubbers, nitrile rubber, halogenated nitrile rubber, hydrogenated nitrile rubber, and tetrafluoroethylene-propylene rubber. In certain embodiments, up to 40% by weight (up to 40 parts or phr), up to 30% by weight (up to 30 parts or phr), up to 20% by weight (up to 20 parts or phr), up to 10% by weight (up to 10 parts or phr), up to 5% by weight (up to 5 parts or phr) of the rubber comprises at least one of: styrene-isoprene rubber, butadiene-isoprene-rubber, styrene-isoprene-butadiene rubber, butyl rubber (both halogenated and non-halogenated), neoprene (polychloroprene), acrylonitrile-butadiene rubber (NBR), silicone rubber, fluorinated rubber, polyacrylate rubber (copolymer of acrylate monomer and vinyl ether), ethylene acrylic rubber, ethylene vinyl acetate copolymer (EVA), epichlorohydrin rubbers, chlorinated polyethylene rubbers, chlorosulfonated polyethylene rubbers, nitrile rubber, halogenated nitrile rubber, hydrogenated nitrile rubber, and tetrafluoroethylene-propylene rubber. In other embodiments, 0% by weight (0 parts or phr) of the rubber comprises styrene-isoprene rubber, butadiene-isoprene-rubber, styrene-isoprene-butadiene rubber, butyl rubber (both halogenated and non-halogenated), neoprene (polychloroprene), acrylonitrile-butadiene rubber (NBR), silicone rubber, fluorinated rubber, polyacrylate rubber (copolymer of acrylate monomer and vinyl ether), ethylene acrylic rubber, ethylene vinyl acetate copolymer (EVA), epichlorohydrin rubbers, chlorinated polyethylene rubbers, chlorosulfonated polyethylene rubbers, nitrile rubber, halogenated nitrile rubber, hydrogenated nitrile rubber, and tetrafluoroethylene-propylene rubber; in such embodiments, 100 phr (or 100 parts) of the rubber comprises at least one of: natural rubber, synthetic polyisoprene rubber, polybutadiene rubber, and styrene-butadiene rubber. In yet other embodiments, up to 100% by weight (100 parts or phr), including up to 90% by weight (90 parts or phr), up to 80% by weight (80 parts or phr), up to 70% by weight (70 parts or phr) and up to 60% by weight (60 parts or phr) of the rubber comprises at least one of: styrene-isoprene rubber, butadiene-isoprene-rubber, styrene-isoprene-butadiene rubber, butyl rubber (both halogenated and non-halogenated), neoprene (polychloroprene), acrylonitrile-butadiene rubber (NBR), silicone rubber, fluorinated rubber, polyacrylate rubber (copolymer of acrylate monomer and vinyl ether), ethylene acrylic rubber, ethylene vinyl acetate copolymer (EVA), epichlorohydrin rubbers, chlorinated polyethylene rubbers, chlorosulfonated polyethylene rubbers, nitrile rubber, halogenated nitrile rubber, hydrogenated nitrile rubber, and tetrafluoroethylene-propylene rubber.

In certain embodiments of the first and second embodiments disclosed herein, the rubber composition comprises no more than 5 phr (5 parts), preferably 0 phr (0 parts) of polyisobutylene-containing polymer or copolymer.

In certain embodiments of the first and second embodiments disclosed herein, the rubber composition is formulated such that the at least one rubber comprises a polymer, a copolymer, or a combination thereof (i.e., more than one polymer, more than one copolymer, one polymer and one copolymer, more than one polymer and one copolymer, more than one copolymer and one polymer, or more than one copolymer and more than one polymer) when more than one rubber is utilized. In certain embodiments of the first and second embodiments disclosed herein, the at least one rubber includes at least one conjugated diene monomer-containing polymer or copolymer. Examples of suitable conjugated diene monomers according to certain embodiments of the first and second embodiments disclosed herein include, but are not limited to, 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, 2,4-hexadiene, 1,3-cyclopentadiene, 1,3-cyclohexadiene, 1,3-cycloheptadiene, and 1,3-cyclooctadiene, and derivatives thereof. It should be understood that mixtures of two or more conjugated diene monomers may be utilized for the rubber(s) or polymer(s) in the rubber compositions of certain embodiments of the first and second embodiments. In certain embodiments of the first and second embodiments disclosed herein, the at least one rubber is at least one of: styrene-butadiene rubber, polybutadiene, synthetic polyisoprene rubber, and natural rubber.

As discussed above, in certain embodiments according to the first and second embodiments, the rubber composition is formulated such that the at least one rubber comprises polybutadiene. In certain embodiments according to the first and second embodiments, the polybutadiene comprises a high cis polybutadiene. In certain embodiments according to the first and second embodiments, the high cis polybutadiene has a cis 1,4-bond content of 85% of greater, 90% or greater, 92% or greater, or 95% or greater. In certain embodiments of the first and second embodiments, the polybutadiene has a cis 1,4-bond content of 85-99%, 90-99%, 90-98%, 90-97%, 92-99%, 92-98%, 92-97%, 95-99%, 95-98%, or 95-97%.

Generally, various polymerization methods are known for producing polybutadiene having a cis 1,4-bond content of 85% or greater, 90% or greater, 92% or greater, or 95% or greater and it should be understood that the particular method by which the polybutadiene is produced is not limited as long as the resulting polybutadiene has the specified cis 1,4-bond content. The percentages are based upon the number of diene mer units adopting the cis-1,4 linkage versus the total number of diene mer units. Polymerization of high-cis 1,4-polybutadiene is described in U.S. Pat. Nos. 3,297,667, 3,541,063, 3,794,604, 4,461,883, 4,444,903, 4,525,594, 4,699,960, 5,017,539, 5,428,119, 5,064,910, and 5,844,050, 7,094,849, all of which are hereby incorporated by reference. Exemplary polymerization methods include, but are not limited to, those employing Ziegler-Natta catalysts based on transition metals (e.g., lanthanides such as neodymium), nickel catalysts and titanium-based catalysts as well as solution, emulsion and bulk polymerization processes. Generally, the cis 1,4-, vinyl 1,2-, and trans 1,4-bond linkage contents in a given polymer such as polybutadiene can be determined by standard and well-established analytical methods such as infrared spectroscopy.

As discussed above, in certain embodiments according to the first and second embodiments, the rubber composition is formulated such that at least one rubber comprises polyisoprene. In certain embodiments according to the first and second embodiments, the polyisoprene comprises high cis polyisoprene. In certain embodiments according to the first and second embodiments, the high cis polyisoprene has a cis 1,4-bond content of 90% of greater. In certain embodiments of the first and second embodiments, the polyisoprene has a cis 1,4-bond content of 90% or greater, 92% or greater, or 95% or greater. In certain embodiments of the first and second embodiments, the polyisoprene has a cis 1,4-bond content of 90-99%, 90-98%, 90-97%, 92-99%, 92-98%, 92-97%, 95-99%, 95-98%, or 95-97%.

Generally, various polymerization methods are known for producing polyisoprene, including polyisoprene having a cis 1,4-bond content of 90% or greater, and it should be understood that the particular method by which the polyisoprene is produced is not limited as long as the resulting polymer has the desired cis 1,4-bond content. As previously discussed with respect to polybutadiene, the percentages are based upon the number of diene mer units adopting the cis-1,4 linkage versus the total number of diene mer units. Polymerization of high-cis polyisoprene is described in U.S. Pat. Nos. 8,664,343; 8,188,201; 7,008,899; 6,897,270; and 6,699,813, all of which are hereby incorporated by reference. Exemplary polymerization methods include, but are not limited to, those employing Ziegler-Natta catalyst systems and those employing anionic polymerization with organometallic catalysts such as alkyl lithium in hydrocarbon solvents. As previously discussed with respect to polybutadiene, the cis-1,4-, cis-1,2-, and trans-1,4-linkage contents in a given polymer such as polyisoprene can be determined by standard and well-established analytical methods such as infrared spectroscopy.

As discussed above, in certain embodiments according to the first and second embodiments, the rubber composition is formulated such that at least one rubber comprises the copolymer styrene-butadiene rubber (SBR). SBR is a copolymer of styrene and butadiene monomers. In certain embodiments according to the first and second embodiments disclosed herein, the SBR used in the rubber composition comprises about 10 to about 50% styrene monomer and about 50 to about 90% butadiene monomer by weight. Generally, SBR is produced by solution or emulsion polymerization methods; however, it should be understood that the particular method by which the SBR is produced is not limited. The styrene and butadiene monomer content in a given SBR copolymer can be determined by standard and well-established analytical methods such as infrared spectroscopy.

Numerous commercial sources of the foregoing rubbers are well-known. As non-limiting examples, Firestone Polymers offers various grades of its Diene™ polybutadiene which have varying cis 1,4-bond contents (e.g., 40% and 96%) as well as various grades of its Duradene™ solution polymerized styrene-butadiene copolymer. Other commercial sources of the rubbers are well known, including sources for emulsion polymerized styrene-butadiene copolymer, functionalized versions of styrene-butadiene copolymer, neoprene, polybutadiene, synthetic polyisoprene rubber, and natural rubber.

In certain embodiments according to the first and second embodiments disclosed herein, the rubber composition is formulated such that the at least one rubber of the rubber composition comprises a functionalized polymer. In certain such embodiments, the rubber composition comprises about 5 to about 100 parts or phr (e.g., 5 parts or phr, 10 parts or phr, 15 parts or phr, 20 parts or phr, 25 parts or phr, 30 parts or phr, 35 parts or phr, 40 parts or phr, 45 parts or phr, 50 parts or phr, 55 parts or phr, 60 parts or phr, 65 parts or phr, 70 parts or phr, 75 parts or phr, 80 parts or phr, 85 parts or phr, 90 parts or phr, 95 parts or phr, 100 parts or phr) of at least one functionalized polymer, including 5 phr to 100 phr, about 10 to about 90 phr, 10 phr to 90 phr, about 10 to about 70 phr, 10 phr to 70 phr, about 10 to about 50 phr, and 10 phr to 50 phr. In certain embodiments according to the first and second embodiments disclosed herein, the functionalized polymer comprises a polymer with a silica-reactive functional group, a nitrogen-containing functional group, an oxygen-containing functional group, a sulfur-containing functional group, or a combination of the foregoing. Non-limiting examples of silica-reactive functional groups that are known to be utilized in functionalizing conjugated diene polymers and are suitable for use in the rubber compositions of certain embodiments of the first and second embodiments disclosed herein include nitrogen-containing functional groups, silicon-containing functional groups, oxygen or sulfur-containing functional groups, and metal-containing functional groups. As used herein, the term functionalized polymer should be understood to include polymers (including conjugated diene monomer-containing polymer or copolymer rubbers) with a functional group at one or both terminus (e.g., from use of a functionalized initiator, a functionalized terminator, or both), a functional group in the main chain of the polymer, and combinations thereof. For example, a silica-reactive functionalized polymer may have the functional group at one or both terminus, in the main chain thereof, or both in the main chain and at one or both terminus.

Non-limiting examples of nitrogen-containing functional groups that are known to be utilized in functionalizing rubbers include, but are not limited to, any of a substituted or unsubstituted amino group, an amide residue, an isocyanate group, an imidazolyl group, an indolyl group, a nitrile group, a pyridyl group, and a ketimine group. The foregoing substituted or unsubstituted amino group should be understood to include a primary alkylamine, a secondary alkylamine, or a cyclic amine, and an amino group derived from a substituted or unsubstituted imine. In certain embodiments according to the first and second embodiments disclosed herein, the rubber composition comprises a functionalized conjugated diene monomer-containing polymer or copolymer rubber having at least one functional group selected from the foregoing list.

Non-limiting examples of silicon-containing functional groups that are known to be utilized in functionalizing rubbers include, but are not limited to, an organic silyl or siloxy group, and more precisely, the functional group may be selected from an alkoxysilyl group, an alkylhalosilyl group, a siloxy group, an alkylaminosilyl group, and an alkoxyhalosilyl group. Suitable silicon-containing functional groups for use in functionalizing rubbers also include those disclosed in U.S. Pat. No. 6,369,167, the entire disclosure of which is hereby incorporated by reference. In certain embodiments according to the first and second embodiments disclosed herein, the rubber composition comprises a functionalized rubber having at least one functional group selected from the foregoing list.

Non-limiting examples of oxygen or sulfur-containing functional groups that are known to be utilized in functionalizing rubbers include, but are not limited to, a hydroxyl group, a carboxyl group, an epoxy group, a glycidoxy group, a diglycidylamino group, a cyclic dithiane-derived functional group, an ester group, an aldehyde group, an alkoxy group, a ketone group, a thiocarboxyl group, a thioepoxy group, a thioglycidoxy group, a thiodiglycidylamino group, a thioester group, a thioaldehyde group, a thioalkoxy group and a thioketone group. In certain embodiments, the foregoing alkoxy group may be an alcohol-derived alkoxy group derived from a benzophenone. In certain embodiments according to the first and second embodiments disclosed herein, the rubber composition comprises a functionalized conjugated diene monomer-containing polymer or copolymer rubber having at least one functional group selected from the foregoing list.

Generally, rubbers, including conjugated diene monomer-containing polymer or copolymer rubbers, may be prepared and recovered according to various suitable methods such as batch, semi-continuous, or continuous operations, as are well known to those having skill in the art. The polymerization can also be carried out in a number of different polymerization reactor systems, including but not limited to bulk polymerization, vapor phase polymerization, solution polymerization, suspension polymerization, coordination polymerization, and emulsion polymerization. The polymerization may be carried out using a free radical mechanism, an anionic mechanism, a cationic mechanism, or a coordination mechanism.

Typically, in the rubber compositions according to the first and second embodiments disclosed herein, the overall composition contains 100 phr (or 100 parts, either in total) of at least one rubber. In other words, the total amount of all rubbers is considered to be 100 parts (by weight) and can be denoted 100 phr. Other components are added based upon 100 parts (in total) of rubber(s). As a non-limiting example, 60 parts of styrene-butadiene copolymer could be utilized along with 40 parts of polybutadiene polymer and 60 parts of silica; these amounts would be described herein as 60 phr or 60 parts of styrene-butadiene copolymer, 40 phr or 40 parts of polybutadiene polymer, and 60 phr of silica.

Reinforcing Filler

As discussed above, according to the first and second embodiments disclosed herein, the rubber composition comprises 5 to 200 phr of at least one reinforcing filler. One or more than one reinforcing filler may be utilized in the rubber compositions according to the first and second embodiments disclosed herein. In certain embodiments of the first and second embodiments disclosed herein, the total amount of the reinforcing filler is 5 to 200 phr, including about 10 to about 200 phr, 10 to 200 phr, about 10 to about 175 phr, 10 to 175 phr, about 25 to about 150 phr, 25 to 150 phr, about 35 to about 150 phr, 35 to 150 phr, about 25 to about 125 phr, 25 to 125 phr, about 25 to about 100 phr, 25 to 100 phr, about 25 to about 80 phr, 25 to 80 phr, about 35 to about 125 phr, 35 to 125 phr, about 35 to about 100 phr, 35 to 100 phr, about 35 to about 80 phr, and 35 to 80 phr of at least one reinforcing filler. In certain embodiments, the useful upper range for the amount of reinforcing filler can be considered to be somewhat limited by the high viscosity imparted by fillers of this type.

As used herein, the term "reinforcing" with respect to "reinforcing carbon black filler," "reinforcing silica filler," and "reinforcing fillers" generally should be understood to encompass both fillers that are traditionally described as reinforcing as well as fillers that may traditionally be described as semi-reinforcing. Traditionally, the term "reinforcing filler" is used to refer to a particulate material that has a nitrogen absorption specific surface area ($N_2SA$) of more than about 100 $m^2/g$, and in certain instances more than 100 $m^2/g$, more than about 125 $m^2/g$, more than 125 $m^2/g$, or even more than about 150 $m^2/g$ or more than 150 $m^2/g$. Alternatively (or additionally), the traditional use of the term "reinforcing filler" can also be used to refer to a particulate material that has a particle size of about 10 nm to about 50 nm (including 10 nm to 50 nm). Traditionally, the term "semi-reinforcing filler" is used to refer to a filler that is intermediary in either particle size, surface area ($N_2SA$), or both, to a non-reinforcing filler (as discussed below) and a reinforcing filler. In certain embodiments of the first and second embodiments disclosed herein, the term "reinforcing filler" is used to refer to a particulate material that has a nitrogen absorption specific surface area ($N_2SA$) of about 20 $m^2/g$ or greater, including 20 $m^2/g$ or greater, more than about 50 $m^2/g$, more than 50 $m^2/g$, more than about 100 $m^2/g$, more than 100 $m^2/g$, more than about 125 $m^2/g$, and more than 125 $m^2/g$. In certain embodiments of the first and second embodiments disclosed herein, the term "reinforcing filler" is used to refer to a particulate material that has a particle size of about 10 nm up to about 1000 nm, including 10 nm to 1000 nm, about 10 nm up to about 50 nm and 10 nm to 50 nm.

In certain embodiments of the first and second embodiments disclosed herein, the at least one reinforcing filler comprises at least one of: carbon black or silica. In other words, in such embodiments, the at least one reinforcing filler comprises at least one carbon black, at least one silica, or at least one carbon black and at least one silica. In certain embodiments of the first and second embodiments disclosed herein, the at least one reinforcing filler comprises at least one of: carbon black or silica, and further comprises at least one additional reinforcing filler. In other words, in such embodiments, the at least one reinforcing filler comprises at least one carbon black and at least one additional reinforcing filler (other than silica), at least one silica and at least one additional reinforcing filler (other than carbon black), or at least one silica and at least one carbon black and at least one additional reinforcing filler (other than the carbon black or silica). As discussed in more detail below, in certain embodiments of the first and second embodiments disclosed herein, the at least one reinforcing filler comprises at least one reinforcing filler other than carbon black or silica.

Silica

As discussed above, in certain embodiments of the first and second embodiments disclosed herein the rubber composition comprises at least one reinforcing filler which comprises silica. Suitable reinforcing silica fillers for use in the rubber composition of certain embodiments of the first and second embodiments disclosed herein are well known. Non-limiting examples of reinforcing silica fillers suitable for use in the rubber compositions of certain embodiments of the first and second embodiments disclosed herein include, but are not limited to, precipitated amorphous silica, wet silica (hydrated silicic acid), dry silica (anhydrous silicic acid), fumed silica, calcium silicate and the like. Other suitable reinforcing silica fillers for use in rubber compositions of certain embodiments of the first and second embodiments disclosed herein include, but are not limited to, aluminum silicate, magnesium silicate ($Mg_2SiO_4$, $MgSiO_3$ etc.), magnesium calcium silicate ($CaMgSiO_4$), calcium silicate ($Ca_2SiO_4$ etc.), aluminum silicate ($Al_2SiO_5$, $Al_4.3SiO_4.5H_2O$ etc.), aluminum calcium silicate ($Al_2O_3.CaO_2SiO_2$, etc.), and the like. Among the listed reinforcing silica fillers, precipitated amorphous wet-process, hydrated silica fillers are preferred. Such reinforcing silica fillers are produced by a chemical reaction in water, from which they are precipitated as ultrafine, spherical particles, with primary particles strongly associated into aggregates, which in turn combine less strongly into agglomerates. The surface area, as measured by the BET method, is a preferred measurement for characterizing the reinforcing character of different reinforcing silica fillers. In certain embodiments of the first and second embodiments disclosed herein, the rubber composition comprises a reinforcing silica filler having a surface area (as measured by the BET method) of about 32 $m^2/g$ to about 400 $m^2/g$ (including 32 $m^2/g$ to 400 $m^2/g$), with the range of about 100 $m^2/g$ to about 300 $m^2/g$ (including 100 $m^2/g$ to 300 $m^2/g$) being preferred, and the range of about 150 $m^2/g$ to about 220 $m^2/g$ (including 150 $m^2/g$ to 220 $m^2/g$) being included. In certain embodiments of the first and second embodiments disclosed herein, the rubber composition comprises reinforcing silica filler having a pH of about 5.5 to about 7 or slightly over 7, preferably about 5.5 to about 6.8. Some of the commercially available reinforcing silica fillers which can be used in the rubber compositions of certain embodiments of the first and second embodiments disclosed herein include, but are not limited to, Hi-Sil® 190, Hi-Sil® 210, Hi-Sil® 215, Hi-Sil® 233, Hi-Sil® 243, and the like, produced by PPG Industries (Pittsburgh, Pa.). As well, a number of useful commercial grades of different reinforcing silica fillers are also available from Degussa Corporation (e.g., VN2, VN3), Rhone Poulenc (e.g., Zeosil™ 1165 MP), and J. M. Huber Corporation.

In certain embodiments of the first and second embodiments disclosed herein, particularly those where the reinforcing filler includes silica, the rubber composition further comprises one or more silane coupling agents. Silane coupling agents are known to be particularly useful in preventing or reducing aggregation of the silica filler in the rubber composition. Aggregates of the silica filler particles are believed to increase the viscosity of the rubber composition, and, therefore, preventing this aggregation reduces the viscosity and improves the processibility and blending of the rubber composition.

Generally, any conventional type of silane coupling agent can be used in the rubber compositions of the first and second embodiments disclosed herein, such as those having a silane and a constituent component or moiety that can react with an elastomer, particularly a vulcanizable polymer. The silane coupling agent acts as a connecting bridge between silica and the polymer. Suitable silane coupling agents for use in the rubber compositions of the first and second embodiments disclosed herein include those containing groups such as alkyl alkoxy, mercapto, blocked mercapto, sulfide-containing (e.g., monosulfide-based alkoxy-containing, disulfide-based alkoxy-containing, tetrasulfide-based alkoxy-containing), amino, vinyl, epoxy, and combinations thereof.

In certain embodiments of the first and second embodiments disclosed herein, as discussed in more detail below, the reinforcing silica filler comprises a silica that has been pre-treated with a silica coupling agent; preferably the pre-treated silica comprises a silica that has been pre-treated with a silane-containing silica coupling agent.

Carbon Black

As discussed above, in certain embodiments of the first and second embodiments disclosed herein the rubber composition comprises at least one reinforcing filler which comprises carbon black. As discussed in more detail below, most carbon blacks are commonly understood to be reinforcing fillers. In certain embodiments of the first and second embodiments disclosed herein, the rubber composition comprises carbon black in an amount of from zero to about 50% by weight of the total reinforcing filler, including zero to 50%, about 5% to about 30%, 5% to 30%, from about 5% to about 20%, 5% to 20%, about 10% to about 30%, 10% to 30%, about 10% to about 20%, and 10% to 20% by weight of the total reinforcing filler. In certain embodiments of the first and second embodiments disclosed herein, the carbon black comprises no more than about 30% by weight (including no more than 30% by weight) of the total reinforcing filler in the rubber composition. In certain embodiments of the first and second embodiments disclosed herein, the rubber composition comprises about 5 to about 100 phr (including 5 to 100 phr) of one or more carbon blacks.

Generally, suitable carbon black for use as a reinforcing filler in the rubber composition of certain embodiments of the first and second embodiments disclosed herein includes any of the commonly available, commercially-produced carbon blacks, including those having a surface area of at least about 20 $m^2/g$ (including at least 20 $m^2/g$) and, more preferably, at least about 35 $m^2/g$ up to about 200 $m^2/g$ or higher (including 35 $m^2/g$ up to 200 $m^2/g$). Surface area values used in this application for carbon blacks are determined by ASTM D-1765 using the cetyltrimethyl-ammonium bromide (CTAB) technique. Among the useful carbon blacks are furnace black, channel blacks, and lamp blacks. More specifically, examples of useful carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks which can be utilized include acetylene blacks. In certain embodiments of the first and second embodiments disclosed herein, the rubber composition includes a mixture of two or more of the foregoing blacks. Typical suitable carbon blacks for use in certain embodiments of the first and second embodiments disclosed herein are N-110, N-220, N-339, N-330, N-351, N-550, and N-660, as designated by ASTM D-1765-82a. The carbon blacks utilized can be in pelletized form or an unpelletized flocculent mass. Preferably, for more uniform mixing, unpelletized carbon black is preferred.

Other Reinforcing Fillers

As discussed above, in certain embodiments of the first and second embodiments disclosed herein, the rubber composition comprises at least one reinforcing filler comprising a reinforcing filler other than carbon black or silica. In those embodiments of the first and second embodiments disclosed herein where the rubber composition comprises at least one reinforcing filler comprising silica, carbon black, or both, this reinforcing filler other than carbon black or silica may be referred to as an additional reinforcing filler. In certain embodiments of the first and second embodiments disclosed herein, the rubber composition comprises at least one of: carbon black or silica, and at least one additional reinforcing filler. In other words, in certain embodiments of the first and second embodiments disclosed herein, the rubber composition comprises at least reinforcing carbon black and at least one additional reinforcing filler; at least one reinforcing silica filler and at least one additional reinforcing filler; or at least one reinforcing carbon black, at least one reinforcing silica filler, and at least one additional reinforcing filler.

Suitable reinforcing fillers other than carbon black or silica for use in the rubber composition of certain embodiments of the first and second embodiments disclosed herein are well known. Non-limiting examples of suitable additional reinforcing fillers for use in the rubber compositions of certain embodiments of the first and second embodiments disclosed herein include, but are not limited to, alumina, aluminum hydroxide, clay (reinforcing grades), magnesium hydroxide, boron nitride, aluminum nitride, titanium dioxide, reinforcing zinc oxide, and combinations thereof.

Non-Reinforcing Fillers

In certain embodiments of the first and second embodiments disclosed herein, the rubber composition further comprises at least one non-reinforcing filler. In other words, in certain embodiments of the first and second embodiments disclosed herein, the rubber composition comprises at least one non-reinforcing filler in addition to the at least one reinforcing filler. The term "non-reinforcing filler" is used to refer to a particulate material that has a nitrogen absorption specific surface area ($N_2SA$) of less than about 20 $m^2/g$ (including less than 20 $m^2/g$), and in certain embodiments less than about 10 $m^2/g$ (including less than 10 $m^2/g$). The $N_2SA$ surface area of a particulate material can be determined according to various standard methods including ASTM D6556. Additionally or alternatively, the term "non-reinforcing filler" is used to refer to a particulate material that has a particle size of greater than about 1000 nm (including greater than 1000 nm).

Suitable non-reinforcing fillers for use in the rubber composition of certain embodiments of the first and second embodiments disclosed herein are well known. In certain embodiments of the first and second embodiments disclosed herein, the rubber composition further comprises at least one of the following non-reinforcing fillers: clay, graphite, talc, mica, titanium dioxide, magnesium dioxide, aluminum oxide, titanium oxide, calcium oxide, aluminum hydroxide, starch, boron nitride, silicon nitride, aluminum nitride, etc.), silicon carbide, aluminum carbonate ($Al_2(CO_3)_2$), non-reinforcing grades of calcium carbonate ($CaCO_3$), magnesium carbonate ($MgCO_3$), calcium oxide, mica, calcium oxide, boron nitride, silicon nitride, aluminum nitride, calcium silicate (or silicon carbide ($Ca_2SiO_4$, etc.), or crystalline aluminosilicates. In certain embodiments of the first and second embodiments disclosed herein, the rubber composition further comprises a non-reinforcing carbon black. Examples of suitable carbon blacks having a nitrogen surface area of no more than 20 $m^2$/g include, but are not limited to, thermal blacks or the N9 series carbon blacks (also referred to as the N-900 series), such as those with the ASTM designation N-907, N-908, N-990, and N-991. Various carbon blacks meeting the forgoing are commercially available, including but not limited to Thermax® N990 carbon black from Cancarb Limited (Medicine Hat, Alberta, Canada).

In certain embodiments of the first and second embodiments, the rubber composition further comprises at least one inorganic filler (other than silica). Such an inorganic filler can be described as a non-silica inorganic filler. In other words, certain embodiments of the first and second embodiments disclosed herein, the rubber composition comprises at least one inorganic filler (other than silica) in addition to the at least one reinforcing filler.

Inorganic fillers (other than silica) suitable for use in rubber compositions are well known. In certain embodiments of the first and second embodiments disclosed herein, the rubber composition comprises at one of the following inorganic fillers: aluminum hydroxide, talc, clay, alumina ($Al_2O_3$), aluminum hydrate ($Al_2O_3H_2O$), aluminum hydroxide ($Al(OH)_3$), aluminum carbonate ($Al_2(CO_3)_2$), aluminum nitride, aluminum magnesium oxide ($MgOAl_2O_3$), aluminum silicate ($Al_2SiO_5$, $Al_4.3SiO_4.5H_2O$ etc.), aluminum calcium silicate ($Al_2O_3.CaO_2SiO_2$, etc.), pyrofilite ($Al_2O_34SiO_2.H_2O$), bentonite ($Al_2O_3.4SiO_2.2H_2O$), boron nitride, mica, kaolin, glass balloon, glass beads, calcium oxide (CaO), calcium hydroxide ($Ca(OH)_2$), calcium carbonate ($CaCO_3$), calcium silicate ($Ca_2SiO_4$ etc.), magnesium carbonate, magnesium hydroxide ($MH(OH)_2$), magnesium oxide (MgO), magnesium carbonate ($MgCO_3$), magnesium silicate ($Mg_2SiO_4$, $MgSiO_3$ etc.), magnesium calcium silicate ($CaMgSiO_4$), titanium oxide, titanium dioxide, potassium titanate, barium sulfate, zirconium oxide ($ZrO_2$), zirconium hydroxide [$Zr(OH)_2.nH_2O$], zirconium carbonate [$Zr(CO_3)_2$], crystalline aluminosilicates, reinforcing grades of zinc oxide (i.e., reinforcing zinc oxide), and combinations thereof. In certain embodiments of the first and second embodiments disclosed herein, the rubber composition comprises at least one reinforcing filler (as discussed above) and at least one of the following inorganic fillers: aluminum hydroxide, talc, clay, alumina ($Al_2O_3$), aluminum hydrate ($Al_2O_3H_2O$), aluminum hydroxide ($Al(OH)_3$), aluminum carbonate ($Al_2(CO_3)_2$), aluminum nitride, aluminum magnesium oxide ($MgOAl_2O_3$), aluminum silicate ($Al_2SiO_5$, $Al_4.3SiO_4.5H_2O$ etc.), aluminum calcium silicate ($Al_2O_3.CaO_2SiO_2$, etc.), pyrofilite ($Al_2O_34SiO_2.H_2O$), bentonite ($Al_2O_3.4SiO_2.2H_2O$), boron nitride, mica, kaolin, glass balloon, glass beads, calcium oxide (CaO), calcium hydroxide ($Ca(OH)_2$), calcium carbonate ($CaCO_3$), calcium silicate ($Ca_2SiO_4$ etc.), magnesium carbonate, magnesium hydroxide ($MH(OH)_2$), magnesium oxide (MgO), magnesium carbonate ($MgCO_3$), magnesium silicate ($Mg_2SiO_4$, $MgSiO_3$ etc.), magnesium calcium silicate ($CaMgSiO_4$), titanium oxide, titanium dioxide, potassium titanate, barium sulfate, zirconium oxide ($ZrO_2$), zirconium hydroxide [$Zr(OH)_2.nH_2O$], zirconium carbonate [$Zr(CO_3)_2$], crystalline aluminosilicates, reinforcing grades of zinc oxide (i.e., reinforcing zinc oxide), and combinations thereof.

Cure Package

As discussed above, according to the first and second embodiments disclosed herein the rubber composition comprises a cure package. Generally, the cure package includes at least one of: a vulcanizing agent; a vulcanizing accelerator; a vulcanizing activator (e.g., zinc oxide, stearic acid, and the like); a vulcanizing inhibitor; and an anti-scorching agent. In certain embodiments, the cure package includes at least one vulcanizing agent, at least one vulcanizing accelerator, at least one vulcanizing activator, and optionally a vulcanizing inhibitor and/or an anti-scorching agent. Vulcanizing accelerators and vulcanizing activators act as catalysts for the vulcanization agent. Vulcanizing inhibitors and anti-scorching agents are known in the art and can be selected by one skilled in the art based on the vulcanizate properties desired.

Examples of suitable types of vulcanizing agents for use in the rubber compositions according to certain embodiments of the first and second embodiments, include but are not limited to, sulfur or peroxide-based curing components. Thus, in certain such embodiments, the cure package includes a sulfur-based curative or a peroxide-based curative. Examples of specific suitable sulfur vulcanizing agents include "rubbermaker's" soluble sulfur; sulfur donating curing agents, such as an amine disulfide, polymeric polysulfide, or sulfur olefin adducts; and insoluble polymeric sulfur. Preferably, the sulfur vulcanizing agent is soluble sulfur or a mixture of soluble and insoluble polymeric sulfur. For a general disclosure of suitable vulcanizing agents and other components used in curing, e.g., vulcanizing inhibitor and anti-scorching agents, one can refer to Kirk-Othmer, Encyclopedia of Chemical Technology, 3rd ed., Wiley Interscience, N.Y. 1982, Vol. 20, pp. 365 to 468, particularly Vulcanization Agents and Auxiliary Materials, pp. 390 to 402, or Vulcanization by A. Y. Coran, Encyclopedia of Polymer Science and Engineering, Second Edition (1989 John Wiley & Sons, Inc.), both of which are incorporated herein by reference. Vulcanizing agents can be used alone or in combination. Generally, the vulcanizing agents are used in an amount ranging from 0.1 to 10 phr, including from 1 to 7.5 phr, including from 1 to 5 phr, and preferably from 1 to 3.5 phr.

Vulcanizing accelerators are used to control the time and/or temperature required for vulcanization and to improve properties of the vulcanizate. Examples of suitable vulcanizing accelerators for use in the rubber compositions according to certain embodiments of the first and second embodiments disclosed herein include, but are not limited to, thiazole vulcanization accelerators, such as 2-mercaptobenzothiazole, 2,2'-dithiobis(benzothiazole) (MBTS), N-cyclohexyl-2-benzothiazole-sulfenamide (CBS), N-tert-butyl-2-benzothiazole-sulfenamide (TBBS), and the like; guanidine vulcanization accelerators, such as diphenyl guanidine (DPG) and the like; thiuram vulcanizing accelerators;

carbamate vulcanizing accelerators; and the like. Generally, the total amount of the vulcanization accelerator used ranges from 0.1 to 10 phr, preferably 0.5 to 5 phr.

Vulcanizing activators are additives used to support vulcanization. Generally vulcanizing activators include both an inorganic and organic component. Zinc oxide is the most widely used inorganic vulcanization activator. Various organic vulcanization activators are commonly used including stearic acid, palmitic acid, lauric acid, and zinc salts of each of the foregoing. Generally, the amount of vulcanization activator used ranges from 0.1 to 6 phr, preferably 0.5 to 4 phr.

Vulcanization inhibitors are used to control the vulcanization process and generally retard or inhibit vulcanization until the desired time and/or temperature is reached. Common vulcanization inhibitors include, but are not limited to, PVI (cyclohexylthiophthalmide) from Santogard. Generally, the amount of vulcanization inhibitor is 0.1 to 3 phr, preferably 0.5 to 2 phr.

Other Ingredients

Other ingredients that may be employed (i.e., are optional) in the rubber compositions of certain embodiments of the first and second embodiments are well known to those of skill in the art and include oils (processing and extender), waxes, processing aids, antioxidants, tackifying resins, reinforcing resins, and peptizers. Oils are also referred to herein as plasticizers. In certain embodiments of the first and second embodiments disclosed herein, the rubber composition comprises about 1 to about 40 phr, 1 to 40 phr, about 5 to about 40 phr, 5 to 40 phr, about 5 to about 30 phr, 5 to 30 phr, about 1 to about 20 phr, or 1 to 20 phr (in total) of one or more plasticizers.

Various types of tackifying resins are known to those of skill in the art and may be utilized in the rubber compositions of certain embodiments of the first and second embodiments; these include but not limited to: rosin and its derivatives, hydrocarbon resins, and phenol-formaldehyde resins. One or more than one type as well as one or more than one of each type may be utilized in certain embodiments of the first and second embodiments. As used herein the term "resin" is intended to encompass compounds which are solid (or semi-solid) at room temperature (23° C.) as opposed to being liquid (such as oils) at room temperature. Exemplary types of rosin-type resins include, but are not limited to, gum rosin, wood rosin, tall oil rosin, rosin esters, and combinations thereof. Exemplary types of hydrocarbon resins include, but are not limited to, cyclopentadiene or dicyclopentadiene homopolymer or copolymer resins; terpene/phenol homopolymer or copolymer resins; C5 or C9 fraction homopolymer or copolymer resins; alpha-methylstyrene homopolymer or copolymer resins, and combinations thereof. Exemplary types of phenol-formaldehyde resins include, but are not limited to, those containing alkyl phenols. In certain embodiments of the first and second embodiments, the total amount of tackifying resin used is 1 to 25 phr, including 1 to 20 phr, 1 to 15 phr and 1 to 10 phr. In certain embodiments of the first and second embodiments, the total amount of phenolic resin, acrylic resin, and polyphenylene resin is no more than 25 phr, including no more than 20 phr, no more than 15 phr, no more than 10 phr, and no more than 5 phr.

Various antioxidants are known to those of skill in the art and may be utilized in the rubber compositions of certain embodiments of the first and second embodiments; these include but not limited to phenolic antioxidants, amine phenol antioxidants, hydroquinone antioxidants, alkyldiamine antioxidants, and amine compound antioxidants such as N-phenyl-N'-isopropyl-p-phenylenediamine (IPPD), or N-(1,3-dimethylbutyl)-N'-phenyl-phenylenediamine (6PPD). One or more than one type as well as one or more than one of each type may be utilized in certain embodiments of the first and second embodiments. In certain embodiments of the first and second embodiments, the total amount of antioxidant(s) used is 1 to 5 phr.

Various types of processing and extender oils may be utilized, including, but not limited to aromatic, naphthenic, and low PCA oils. Suitable low PCA oils include those having a polycyclic aromatic content of less than 3 percent by weight as determined by the IP346 method. Procedures for the IP346 method may be found in Standard Methods for Analysis & Testing of Petroleum and Related Products and British Standard 2000 Parts, 2003, 62nd edition, published by the Institute of Petroleum, United Kingdom. Suitable low PCA oils include mild extraction solvates (MES), treated distillate aromatic extracts (TDAE), TRAE, and heavy naphthenics. Suitable MES oils are available commercially as CATENEX SNR from SHELL, PROREX 15, and FLEXON 683 from EXXONMOBIL, VIVATEC 200 from BP, PLAXOLENE MS from TOTAL FINA ELF, TUDALEN 4160/4225 from DAHLEKE, MES-H from REPSOL, MES from Z8, and OLIO MES 5201 from AGIP. Suitable TDAE oils are available as TYREX 20 from EXXONMOBIL, VIVATEC 500, VIVATEC 180, and ENERTHENE 1849 from BP, and EXTENSOIL 1996 from REPSOL. Suitable heavy naphthenic oils are available as SHELLFLEX 794, ERGON BLACK OIL, ERGON H2000, CROSS C2000, CROSS C2400, and SAN JOAQUIN 2000L. Suitable low PCA oils also include various plant-sourced oils such as can be harvested from vegetables, nuts, and seeds. Non-limiting examples include, but are not limited to, soy or soybean oil, sunflower oil (including high oleic sunflower oil), safflower oil, corn oil, linseed oil, cotton seed oil, rapeseed oil, cashew oil, sesame oil, *camellia* oil, jojoba oil, macadamia nut oil, coconut oil, and palm oil. The foregoing processing oils can also be used as an extender oil, i.e., to prepare an oil-extended polymer or copolymer or as a processing or free oil. Generally, for most uses of the rubber compositions in tire components the total amount of oil used (processing oil and extender oil) in the rubber compositions and methods disclosed herein ranges about 1 to about 40 phr, 1 to 40 phr, about 1 to about 20 phr, or 1 to 20 phr.

Methods for Preparing the Rubber Composition

As discussed above, according to the second embodiment, a method for preparing a rubber composition is provided. The method comprises combining (a) 100 parts of at least one rubber, (b) at least one olefin copolymer viscosity modifier, (c) at least one reinforcing filler in an amount of 5 to 200 phr, and (d) a cure package.

The particular steps involved in preparing the rubber composition are generally those of conventionally practiced methods comprising mixing the ingredients in at least one non-productive master-batch stage and a final productive mixing stage. The rubber composition of the first embodiment may be prepared using the process of the second embodiment, although it is not strictly limited to preparation by such a process. In certain embodiments of the first and second embodiments, the rubber composition is prepared by combining the ingredients for the rubber composition (as disclosed above) by methods known in the art, such as, for example, by kneading the ingredients together in a Banbury mixer or on a milled roll. Such methods generally include at least one non-productive master-batch mixing stage and a final productive mixing stage. The term non-productive master-batch stage is known to those of skill in the art and generally understood to be a mixing stage (or stages) where no vulcanizing agents or vulcanization accelerators are added. The term final productive mixing stage is also known to those of skill in the art and generally understood to be the mixing stage where the vulcanizing agents and vulcanization accelerators are added into the rubber composition. In certain embodiments of the first and second embodiments disclosed herein, the rubber composition is prepared by a process comprising more than one non-productive master-batch mixing stage.

Generally, the at one rubber, at least one olefin copolymer viscosity modifier, and at least one reinforcing filler (as well as any silane coupling agent and oil) will be added in a non-productive or master-batch mixing stage or stages. Generally, at least the vulcanizing agent component and the vulcanizing accelerator component of the cure package will be added in a final or productive mixing stage.

In certain embodiments of the first and second embodiments, the rubber composition is prepared using at least one non-productive master batch mixing stage(s) conducted at a temperature of about 130° C. to about 200° C. In certain embodiments of the first and second embodiments, the rubber composition is prepared using a final productive mixing stage conducted at a temperature below the vulcanization temperature in order to avoid unwanted pre-cure of the rubber composition. Therefore, the temperature of the productive or final mixing stage should not exceed about 120° C. and is typically about 40° C. to about 120° C., or about 60° C. to about 110° C. and, especially, about 75° C. to about 100° C. In certain embodiments of the first and second embodiments, the rubber composition is prepared according to a method that includes at least one non-productive mixing stage and at least one productive mixing stage. Where a rubber composition of the first or second embodiment includes fillers other than (or in addition to) carbon black, a separate re-mill stage may be employed for separate addition of a portion or all of the other fillers. This stage often is performed at temperatures similar to, although often slightly lower than, those employed in the masterbatch stage, i.e., ramping from about 90° C. to a drop temperature of about 150° C.

Tires and Tire Components

In certain embodiments, the rubber compositions according to the first and second embodiments are utilized in a tire component. Non-limiting examples of such tire components, include, but are not limited to a tread, sidewall, inner liner, body ply, carcass ply, bead filler, abrasion gum strip, and subtread/undertread. In certain preferred embodiments, the rubber composition according to the first and second embodiments is utilized in a tire tread. The following embodiments should also be considered to be fully disclosed herein: a tire tread comprising the rubber composition according to any of the foregoing embodiments of the first and second embodiments (i.e., as described throughout the present application) and a tire incorporating such a tire tread.

Effect of the at Least One Olefin Copolymer Viscosity Modifier on E'

In certain embodiments of the first and second embodiments, the rubber composition according to the present disclosure (i.e., including the at least one olefin copolymer viscosity modifier) has a lower E' at −20° C. and/or a lower E' at −40° C. along with a higher E' at 30° C. as compared to a rubber composition having an equivalent composition except lacking any olefin copolymer viscosity modifier. The value of E' (which can be measured as described below in the Examples) provides a measurement of a rubber composition's stiffness at a specified temperature. Generally, a rubber composition will be stiffer at lower temperatures (i.e., have a higher E') than at higher temperatures (i.e., have a lower E'). Measurements of E' at different temperatures can provide an indication of various properties of a rubber composition when it is utilized as a tire tread (e.g., E' at −20° C. correlates to snow traction with a relatively lower E' indicating better snow traction, and E' at 30° C. correlates to cornering with a relatively higher E' indicating improved cornering). In certain embodiments of the first and second embodiments, the E' at −20° C. is at least 3%, including at least 4%, at least 5%, and at least 6%, at least 7%, at least 8%, at least 9%, at least 10%, up to 20%, 3-20%, 5-20%, 10-20%, 3-15%, 5-15%, or 5-15% lower than a rubber composition having an equivalent composition except lacking any olefin copolymer viscosity modifier. In certain embodiments of the first and second embodiments, the E' at −40° C. is at least 5%, including at least 6%, at least 7%, and at least 8%, at least 9%, at least 10%, at least 15%, at least 20%, up to about 35% (including up to 35%), 5-35%, 5-30%, 10-35%, 5-30%, 5-25%, or 5-20% lower than a rubber composition having an equivalent composition except lacking any olefin copolymer viscosity modifier. In certain embodiments of the first and second embodiments, the E' at 30° C. is at least 3%, including at least 4%, at least 5%, at least 6%, up to 10%, up to 7.5%, 3-10%, or 3-7.5% higher than a rubber composition having an equivalent composition except lacking any olefin copolymer viscosity modifier. In certain embodiments of the first and second embodiments, the E' at −20° C. is E' at −20° C. is at least 3%, including at least 4%, at least 5%, and at least 6%, at least 7%, at least 8%, at least 9%, at least 10%, up to 20%, 3-20%, 5-20%, 10-20%, 3-15%, 5-15%, or 5-15% lower and the E' at 30° C. is at least 3%, including at least 4%, at least 5%, at least 6%, up to 10%, up to 7.5%, 3-10%, or 3-7.5% higher than a rubber composition having an equivalent composition except lacking any olefin copolymer viscosity modifier. The foregoing descriptions of the improvement in E' are based upon measurements of E' made according to procedure described below in the Examples, and with the E' measurements normalized at 0° C. (i.e., all E' values for a given compound are divided by the value for E' at 0° C. so that E' at 0° C. would be 1). By the phrase a rubber composition having an equivalent composition except lacking any olefin copolymer viscosity modifiers is meant that the comparative rubber composition contains the same ingredients except for having 0 phr of olefin copolymer viscosity modifier. More specifically, the comparative rubber composition may contain the same amount of oil (without any olefin copolymer viscosity modifier) in the form of low PCA oil; guidance in this regard can be considered to be provided by the Examples discussed below. As a non-limiting example, if 10 phr of oil-extended viscosity modifier and 10 phr of process oil were utilized, a control rubber composition could be formulated which contains 20 phr of low PCA process oil having an aniline point of 90-100° C., a pour point of 0-5° C., a kinematic viscosity at 100° C. of 112-135 SUS, a kinematic viscosity at 40° C. of 2800-3200 SUS, % $C_A$ of 15-20%, % $C_P$ of 50-60%, % $C_N$ of 25-30% (carbon type content by Kurtz method), an aromatic compounds content of 37-42%, a saturates compounds content of 50-55%, a polar compounds content of 5-10% (ASTM D2007 method) or if 1 phr of non oil-extended viscosity modifier and 10 phr of process oil were utilized, the control rubber composition could be formulated using 10 phr of the foregoing low PCA process oil.

Miscellaneous

In certain embodiments of the first and second embodiments, the rubber composition meets at least one of the following: (a) at least a majority by weight of the at least one rubber comprises at least one of: natural rubber, polybutadiene, polyisoprene, or styrene-butadiene copolymer; (b) the at least one reinforcing filler comprises: at least silica, optionally in combination with at least one carbon black; (c) the at least one olefin copolymer viscosity modifier comprises an ethylene-α-olefin copolymer; (d) the rubber composition comprises no more than 5 parts, preferably 0 parts of polyisobutylene-containing polymer or copolymer; (e) the rubber composition comprises no more than 25 parts of resin; (f) the rubber composition comprises 1 to 30 phr of at least one oil; or (g) at least 50% by weight of the at least one reinforcing filler comprises silica. In certain embodiments of the first and second embodiments, all of (a)-(g) are met. In certain embodiments of the first and second embodiments, at least (a) is met. In certain embodiments of the first and second embodiments, at least (b) is met. In certain embodiments of the first and second embodiments, at least (c) is met. In certain embodiments of the first and second embodiments, at least (d) is met. In certain embodiments of the first and second embodiments, at least (e) is met. In certain embodiments of the first and second embodiments, at least (f) is met. In certain embodiments of the first and second embodiments, at least (g) is met.

EXAMPLES

The following examples illustrate specific and exemplary embodiments and/or features of the embodiments of the present disclosure. The examples are provided solely for the purposes of illustration and should not be construed as limitations of the present disclosure. Numerous variations over these specific examples are possible without departing from the spirit and scope of the presently disclosed embodiments. It should specifically be understood that the olefin copolymer viscosity modifiers utilized in the examples (both type and amount) can be utilized with rubbers, fillers, and cure package ingredients which differ in amount, composition, or both from those used in the examples (i.e., as fully disclosed in the preceding paragraphs).

Examples 1-18 (Viscosity Modifier in Motor Oil)

In Examples 1-9, rubber compositions were prepared using the ingredients specified in Table 1; these rubber compositions can be described as silica-filled because they contain a majority by weight of silica filler (with only a minority by weight of carbon black). Examples 1-2, 4-5, and 7-8 are control or comparative examples which lack any olefin copolymer viscosity modifier. In Examples 10-19, rubber compositions were prepared using the ingredients specified in Table 2; these rubber compositions can be described as carbon black-filled because they contain carbon black filler (with no silica). Examples 10-11, 13-14, and 16-17 are control or comparative examples which lack any olefin copolymer viscosity modifier. The amount of each ingredient (other than the rubbers which themselves total 100 parts) used is listed in Table 1 in parts per hundred rubber (phr). The rubber compositions were prepared in a three stage mixing process (i.e., two master-batch/non-productive stages, followed by a final batch stage) according to the conditions shown in Table 3 or Table 4.

TABLE 1

| Silica and Motor Oil | | | | | | | | | |
|---|---|---|---|---|---|---|---|---|---|
| Ingredients (in phr) | Ex. 1 | Ex. 2 | Ex. 3 | Ex. 4 | Ex. 5 | Ex. 6 | Ex. 7 | Ex. 8 | Ex. 9 |
| Masterbatch 1 | | | | | | | | | |
| Natural rubber | 20 | 20 | 20 | 20 | 20 | 20 | 20 | 20 | 20 |
| Styrene-butadiene rubber | 80 | 80 | 80 | 0 | 0 | 0 | 0 | 0 | 0 |
| Polybutadiene rubber 1 | 0 | 0 | 0 | 80 | 80 | 80 | 0 | 0 | 0 |
| Polybutadiene rubber 2 | 0 | 0 | 0 | 0 | 0 | 0 | 80 | 80 | 80 |
| Carbon Black | 4 | 4 | 4 | 4 | 4 | 4 | 4 | 4 | 4 |
| Silica | 52.5 | 52.5 | 52.5 | 52.5 | 52.5 | 52.5 | 52.5 | 52.5 | 52.5 |
| Antioxidant | 2.95 | 2.95 | 2.95 | 2.95 | 2.95 | 2.95 | 2.95 | 2.95 | 2.95 |
| Stearic Acid | 2 | 2 | 2 | 2 | 2 | 2 | 2 | 2 | 2 |
| Zinc Oxide | 2.5 | 2.5 | 2.5 | 2.5 | 2.5 | 2.5 | 2.5 | 2.5 | 2.5 |
| Process oil 1 | 10 | 0 | 0 | 10 | 0 | 0 | 10 | 0 | 0 |
| Process oil 2 | 0 | 10 | 0 | 0 | 10 | 0 | 0 | 10 | 0 |
| Viscosity Modifier[1] | 0 | 0 | 10 | 0 | 0 | 10 | 0 | 0 | 10 |
| Masterbatch 2 | | | | | | | | | |
| Silica | 2.5 | 2.5 | 2.5 | 2.5 | 2.5 | 2.5 | 2.5 | 2.5 | 2.5 |
| Silane coupling agent (trialkoxysilyl disulfide type) | 5 | 5 | 5 | 5 | 5 | 5 | 5 | 5 | 5 |
| Final Batch | | | | | | | | | |
| Sulfur | 1.5 | 1.5 | 1.5 | 1.5 | 1.5 | 1.5 | 1.5 | 1.5 | 1.5 |
| Accelerators | 4.1 | 4.1 | 4.1 | 4.1 | 4.1 | 4.1 | 4.1 | 4.1 | 4.1 |

Process oil 1 = Black Oil from Ergon (low PCA oil)

Process oil 2 = Naphthenic oil

[1] = Viscosity modifier added in an oil-extended form (Exxon-Mobil 10W-40 motor oil), the phr amount indicates the amount of oil-extended viscosity modifier utilized.

TABLE 2

Carbon Black and Motor Oil

| Ingredients (in phr) | Ex. 10 | Ex. 11 | Ex. 12 | Ex. 13 | Ex. 14 | Ex. 15 | Ex. 16 | Ex. 17 | Ex. 18 |
|---|---|---|---|---|---|---|---|---|---|
| Masterbatch 1 | | | | | | | | | |
| Natural rubber | 20 | 20 | 20 | 20 | 20 | 20 | 20 | 20 | 20 |
| Styrene-butadiene rubber | 80 | 80 | 80 | 0 | 0 | 0 | 0 | 0 | 0 |
| Polybutadiene rubber 1 | 0 | 0 | 0 | 80 | 80 | 80 | 0 | 0 | 0 |
| Polybutadiene rubber 2 | 0 | 0 | 0 | 0 | 0 | 0 | 80 | 80 | 80 |
| Carbon Black | 50 | 50 | 50 | 50 | 50 | 50 | 50 | 50 | 50 |
| Antioxidant | 2.95 | 2.95 | 2.95 | 2.95 | 2.95 | 2.95 | 2.95 | 2.95 | 2.95 |
| Stearic Acid | 2 | 2 | 2 | 2 | 2 | 2 | 2 | 2 | 2 |
| Zinc Oxide | 2.5 | 2.5 | 2.5 | 2.5 | 2.5 | 2.5 | 2.5 | 2.5 | 2.5 |
| Process oil 1 | 10 | 0 | 0 | 10 | 0 | 0 | 10 | 0 | 0 |
| Process oil 2 | 0 | 10 | 0 | 0 | 10 | 0 | 0 | 10 | 0 |
| Viscosity Modifier[1] | 0 | 0 | 10 | 0 | 0 | 10 | 0 | 0 | 10 |
| Final Batch | | | | | | | | | |
| Sulfur | 1.5 | 1.5 | 1.5 | 1.5 | 1.5 | 1.5 | 1.5 | 1.5 | 1.5 |
| Accelerators | 1.3 | 1.3 | 1.3 | 1.3 | 1.3 | 1.3 | 1.3 | 1.3 | 1.3 |

Process oil 1 = Black Oil from Ergon (low PCA oil)
Process oil 2 = Naphthenic oil
[1] = Viscosity modifier added in an oil-extended form (Exxon-Mobil 10W-40 motor oil), the phr amount indicates the amount of oil-extended viscosity modifier utilized.

TABLE 3

Mixing Parameters (Silica-Filled Compositions)

| Stage | Time | Condition |
|---|---|---|
| Master-Batch Stage 1 (initial temp: 80° C., rotor rpm started at 65) | 0 seconds | Charge polymers |
| | 15 seconds | Charge 50% of filler (e.g., any carbon black and/or silica) and other master-batch ingredients, increase rotor to 75 rpm |
| | 95 seconds | Charge 50% of filler Drop based on max temperature of 311° F. (155° C.) |
| Master-Batch Stage 2 (initial temp: 90° C., rotor rpm started at 77) | 0 seconds | Charge master batch, silica and silane Drop based on max temperature of 302° F. (150° C.) |
| Final Batch Stage (initial temp: 70° C., rotor rpm at 77) | 0 seconds | Charge Master-Batch 2 |
| | 0 seconds | Charge curatives (i.e., sulfur and accelerators). Drop based on max temperature of 210° F. (99° C.) |

TABLE 4

Mixing Parameters (Carbon Black Filled Compositions)

| Stage | Time | Condition |
|---|---|---|
| Master-Batch Stage 1 (initial temp: 170° C., rotor rpm started at 115) | 0 seconds | Charge polymers |
| | 15 seconds | Charge any oil, filler (e.g., any carbon black and/or silica) and other master-batch ingredients Drop based on max temperature of 320° F. (160° C.) |
| Final Batch Stage (initial temp: 70° C., rotor rpm at 77) | 0 seconds | Charge masterbatch and curatives Drop based on max temperature of 210° F. (99° C.) |

Examples 19-22

In Examples 19-22, rubber compositions were prepared using the ingredients specified in Table 5. Example 19 is a control or comparative example which lacks any olefin copolymer viscosity modifier. The amount of each ingredient (other than the rubbers which themselves total 100 parts) used is listed in Table 5 in phr. The rubber compositions were prepared in a three stage mixing process (i.e., two master-batch/non-productive stages, followed by a final batch stage) according to the same conditions as shown in Table 3.

TABLE 5

(Afton Viscosity Modifier)

| Ingredients (in phr) | Ex. 19 | Ex. 20 | Ex. 21 | Ex. 22 |
|---|---|---|---|---|
| Master-Batch | | | | |
| Natural rubber | 20 | 20 | 20 | 20 |
| Styrene-butadiene rubber | 80 | 80 | 80 | 80 |
| Carbon Black | 4 | 4 | 4 | 4 |
| Silica | 52.5 | 52.5 | 52.5 | 52.5 |
| Zinc Oxide | 2.5 | 2.5 | 2.5 | 2.5 |
| Process oil 1 | 10 | 0 | 10 | 10 |
| Viscosity Modifier[1] | 0 | 10 | 10 | 20 |
| Masterbatch 2 | | | | |
| Silica | 2.5 | 2.5 | 2.5 | 2.5 |
| Silane coupling agent (trialkoxysilyl disulfide type) | 5 | 5 | 5 | 5 |

TABLE 5-continued (Afton Viscosity Modifier)

| Ingredients (in phr) | Ex. 19 | Ex. 20 | Ex. 21 | Ex. 22 |
|---|---|---|---|---|
| Final Batch | | | | |
| Sulfur | 1.5 | 1.5 | 1.5 | 1.5 |
| Accelerators | 4.1 | 4.1 | 4.1 | 4.1 |

Process oil 1 = Black Oil from Ergon (low PCA oil)
[1]Viscosity modifier obtained from Afton Chemical Corporation (trade name HiTEC ® 5777) in an oil-extended form (in mineral oil), the phr amount indicates the amount of oil-extended viscosity modifier utilized (viscosity modifier concentration about 10-20% in the mineral oil).

Examples 23-27

In Examples 23-27, rubber compositions were prepared using the ingredients specified in Table 6. Example 23 is a control or comparative example which lacks any olefin copolymer viscosity modifier and Examples 24-2 are control or comparative examples which utilize a polyalkyl methacrylate copolymer viscosity modifier but no olefin copolymer viscosity modifier. The amount of each ingredient (other than the rubbers which themselves total 100 parts) used is listed in Table 6 in phr. The rubber compositions were prepared in a three stage mixing process (i.e., two masterbatch/non-productive stages, followed by a final batch stage) according to the same conditions as shown in Table 3.

TABLE 6

(Evonik Viscosity Modifier)

| Ingredients (in phr) | Ex. 23 | Ex. 24 | Ex. 25 | Ex. 26 | Ex. 27 |
|---|---|---|---|---|---|
| Master-Batch | | | | | |
| Natural rubber | 20 | 20 | 20 | 20 | 20 |
| Styrene-butadiene rubber | 80 | 80 | 80 | 80 | 80 |
| Carbon Black | 4 | 4 | 4 | 4 | 4 |
| Silica | 52.5 | 52.5 | 52.5 | 52.5 | 52.5 |
| Zinc Oxide | 2.5 | 2.5 | 2.5 | 2.5 | 2.5 |
| Process oil 1 | 10 | 10 | 10 | 10 | 10 |
| Viscosity Modifier[1] | 0 | 5 | 10 | 20 | 30 |
| Masterbatch 2 | | | | | |
| Silica | 2.5 | 2.5 | 2.5 | 2.5 | 2.5 |
| Silane coupling agent (trialkoxysilyl disulfide type) | 5 | 5 | 5 | 5 | 5 |

TABLE 6-continued (Evonik Viscosity Modifier)

| Ingredients (in phr) | Ex. 23 | Ex. 24 | Ex. 25 | Ex. 26 | Ex. 27 |
|---|---|---|---|---|---|
| Final Batch | | | | | |
| Sulfur | 1.5 | 1.5 | 1.5 | 1.5 | 1.5 |
| Accelerators | 4.1 | 4.1 | 4.1 | 4.1 | 4.1 |

Process oil 1 = Black Oil from Ergon (low PCA oil)
[1]Viscosity modifier obtained from Evonik Industries (trade name Viscoplex ® 6-954) in an oil-extended form (in mineral oil), the phr amount indicates the amount of oil-extended viscosity modifier utilized (viscosity modifier concentration about 30-60% in the mineral oil).

After curing at 170° C. for 15 minutes, each of the rubber compositions was tested for tensile properties. The results are shown in Tables 7-10, below. The abbreviation E' is used for dynamic storage modulus, which provides a measure of the stiffness or hardness of the rubber composition. When the rubber composition is incorporated into a tire tread, steering stability including cornering on a dry road surface is generally impacted by E' at higher temperatures (e.g., 30° C.) with higher values preferred and snow traction is generally impacted by E' at lower temperatures (e.g., −20° C. and −40° C.) with lower values preferred. E' measurements were performed using either Ueshima (Tables 7-9) or Gabo (Table 10) equipment according to the following methods. The Ueshima measurements were made on a spectrometer manufactured by Ueshima Seisakusho Co., Ltd (a dynamic viscoelasticity measuring device) with test conditions of −50 to 15° C. at 0.1% strain, and 15 to 100° C. at 4% strain and 52 Hz; the testing was performed following the guidelines of, but not restricted to, the standard procedure described in ASTM D5992. The Gabo measurements were made using a dynamic mechanical thermal spectrometer (Eplexor® 500N from Gabo Qualimeter Testanlagen GmbH of Ahiden, Germany) under the following conditions: measurement mode: tensile test mode, measuring frequency: 52 Hz, applying 0.2% strain from 50 to −5° C. and 1% strain from −5 to 65° C., measuring temperatures (as indicated in Table 1C below), sample shape: 4.75 mm wide×29 mm long×2.0 mm thick. The E' data was normalized at 0° C. (i.e., all E' values for a given compound are divided by the value for E' at 0° C. so that E' at 0° C. would be 1). The percentage increase and decrease in E' for the Examples according to the present disclosure (i.e., Examples 3, 6 and 9) were calculated by dividing the test value by the control value, subtracting that quotient from 100 and multiplying by 100%, with the first-listed value being test value (e.g., for Example 3)/first control value (i.e., Example 1) and the second-listed value being test value/second control value (i.e., Example 2).

TABLE 7

(Silica and Motor Oil)

| | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| Process oil 1 | 10 | 0 | 0 | 10 | 0 | 0 | 10 | 0 | 0 |
| Process oil 2 | 0 | 10 | 0 | 0 | 10 | 0 | 0 | 10 | 0 |
| Viscosity Modifier | 0 | 0 | 10 | 0 | 0 | 10 | 0 | 0 | 10 |
| Normalized E' at −20° C. | 2.43 | 2.31 | 2.21 | 1.85 | 1.79 | 1.76 | 1.77 | 1.74 | 1.71 |
| Decrease (%) in E' at −20° C. vs. control | — | — | 9.1 / 4.3 | — | — | 4.9 / 1.7 | — | — | 3.4 / 1.7 |
| Normalized E' at −40° C. | 11.46 | 9.12 | 7.69 | 3.09 | 2.93 | 2.71 | 3.15 | 2.79 | 2.96 |
| Decrease (%) in E' at −40° C. vs. control | — | — | 32.9 / 15.7 | — | — | 12.3 / 7.5 | — | — | 6.0 / −6.1 |
| Normalized E' at 30° C. | 0.663 | 0.691 | 0.712 | 0.759 | 0.764 | 0.766 | 0.796 | 0.811 | 0.823 |
| Increase (%) in E' at 30° C. vs. control | — | — | 7.4 / 3.0 | — | — | 0.9 / 0.3 | — | — | 3.4 / 1.5 |

TABLE 8

(Carbon Black and Motor Oil)

|  | Ex. 10 | Ex. 11 | Ex. 12 | Ex. 13 | Ex. 14 | Ex. 15 | Ex. 16 | Ex. 17 | Ex. 18 |
|---|---|---|---|---|---|---|---|---|---|
| Process oil 1 | 10 | 0 | 0 | 10 | 0 | 0 | 10 | 0 | 0 |
| Process oil 2 | 0 | 10 | 0 | 0 | 10 | 0 | 0 | 10 | 0 |
| Viscosity Modifier | 0 | 0 | 10 | 0 | 0 | 10 | 0 | 0 | 10 |
| Normalized E' at −20° C. | 2.67 | 2.52 | 2.34 | 2.06 | 1.95 | 1.90 | 1.98 | 1.92 | 1.86 |
| Decrease (%) in E' at −20° C. vs. control | — | — | 12.4 | — | — | 7.8 | — | — | 6.1 |
|  |  |  | 7.1 |  |  | 2.6 |  |  | 3.1 |
| Normalized E' at −40° C. | 11.45 | 10.10 | 7.98 | 3.55 | 3.24 | 3.03 | 3.42 | 3.16 | 2.95 |
| Decrease (%) in E' at −40° C. vs. control | — | — | 30.3 | — | — | 14.6 | — | — | 13.7 |
|  |  |  | 21.0 |  |  | 6.5 |  |  | 6.6 |
| Normalized E' at 30° C. | 0.610 | 0.619 | 0.633 | 0.702 | 0.713 | 0.723 | 0.704 | 0.726 | 0.727 |
| Increase (%) in E' at 30° C. vs. control | — | — | 3.8 | — | — | 3.0 | — | — | 3.3 |
|  |  |  | 2.3 |  |  | 1.4 |  |  | 0.1 |

TABLE 9

(Afton Viscosity Modifier)

|  | Ex. 19 | Ex. 20 | Ex. 21 | Ex. 22 |
|---|---|---|---|---|
| Process oil | 10 | 0 | 10 | 10 |
| Viscosity Modifier | 0 | 10 | 10 | 20 |
| Normalized E' at −20° C. | 2.28 | 2.16 | 2.35 | 1.95 |
| Decrease (%) in E' at −20° C. vs. control Ex. 19 | — | 5.3 | −3.3 | 14.5 |
| Normalized E' at −40° C. | 10.90 | 7.87 | 9.47 | 7.71 |
| Decrease (%) in E' at −40° C. vs. control Ex. 19 | — | 27.8 | 13.1 | 29.3 |
| Normalized E' at 30° C. | 0.686 | 0.708 | 0.697 | 0.701 |
| Increase (%) in E' at 30° C. vs. control Ex. 19 | — | 3.2 | 1.6 | 2.1 |

TABLE 10

(Evonik Viscosity Modifier)

|  | Ex. 23 | Ex. 24 | Ex. 25 | Ex. 26 | Ex. 27 |
|---|---|---|---|---|---|
| Process oil | — | 10 | 10 | 10 | 10 |
| Viscosity Modifier | 0 | 5 | 10 | 20 | 30 |
| Normalized E' at −20° C. | 2.34 | 2.32 | 2.33 | 2.37 | 2.49 |
| Decrease (%) in E' at −20° C. vs. control Ex. 23 | — | 0.5 | 0.2 | −1.3 | −6.4 |
| Normalized E' at −40° C. | 11.21 | 10.17 | 9.83 | 9.05 | 9.11 |
| Decrease (%) in E' at −40° C. vs. control Ex. 23 | — | 9.3 | 12.3 | 19.3 | 18.7 |
| Normalized E' at 30° C. | 0.681 | 0.682 | 0.678 | 0.659 | 0.634 |
| Increase (%) in E' at 30° C. vs. control Ex. 23 | — | 0.3 | −0.4 | −3.2 | −6.8 |

As can be seen from the data in Tables 7-10, the use of an olefin copolymer viscosity modifier (i.e., Examples 3, 6, 9, 12, 15, 18, and 20-22 generally results in a lowering of E' at lower temperatures (e.g., −20° C. and/or −40° C.) and an increase of E' at higher temperatures (e.g., 30° C.). For those Examples (i.e., Example 21 at −20° C.) using an olefin copolymer viscosity modifier which did not exhibit a decrease in E' at low temperature, it is believed that the respective decrease or increase would be exhibited when the viscosity modifier was used in a non-oil extended form. Among Examples 1-18 the effects are most pronounced in those compositions containing SBR and silica filler (i.e., Example 3) with other polymer and filler combinations showing similar lowering of E' at low temperatures but relatively less increase in E' at high temperatures. The use of the Afton viscosity modifier (i.e., Examples 20-22) resulted in a similar effect (i.e., lowering E' at low temperatures and increasing E' at higher temperatures) as the olefin copolymer viscosity modifier of Examples 1-18. As can be seen from the data of Table 10, the use of the comparative Evonik polyalkyl methacrylate copolymer viscosity modifier failed to consistently achieve a combined lowering of E' at low temperature and increase in E' at high temperature.

This application discloses several numerical range limitations that support any range within the disclosed numerical ranges, even though a precise range limitation is not stated verbatim in the specification, because the embodiments of the compositions and methods disclosed herein could be practiced throughout the disclosed numerical ranges. With respect to the use of substantially any plural or singular terms herein, those having skill in the art can translate from the plural to the singular or from the singular to the plural as is appropriate to the context or application. The various singular or plural permutations may be expressly set forth herein for sake of clarity.

It will be understood by those within the art that, in general, terms used herein, and especially in the appended claims are generally intended as "open" terms. For example, the term "including" should be interpreted as "including but not limited to," the term "having" should be interpreted as "having at least," the term "includes" should be interpreted as "includes but is not limited to." It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references, including but not limited to patents, patent applications, and non-patent literature are hereby incorporated by reference herein in their entirety.

While various aspects and embodiments of the compositions and methods have been disclosed herein, other aspects and embodiments will be apparent to those skilled in the art. The various aspects and embodiments disclosed herein are for purposes of illustration and are not intended to be limiting, with the true scope and spirit being indicated by the claims.

What is claimed is:

1. A tire rubber composition comprising:
   a. 100 parts of at least one rubber;
   b. at least 5 phr of at least one olefin copolymer viscosity modifier having a Mn of 2,000 to 10,000 grams/mole;
   c. at least one reinforcing filler in an amount of 5 to 200 phr; and
   d. a cure package.

2. The tire rubber composition of claim 1, wherein the at least one reinforcing filler comprises at least 50 phr of silica filler which is present in a majority amount by weight of the total amount of reinforcing filler and carbon black which is present in a minority amount by weight of the total amount of reinforcing filler.

3. The tire rubber composition of claim 2, wherein the silica filler has a BET surface area of 100 to 400 $m^2/g$.

4. The tire rubber composition of claim 2, wherein the silica filler has a BET surface area of 100 to 220 $m^2/g$.

5. The tire rubber composition of claim 2, wherein the silica filler has a BET surface area of 220 to 400 $m^2/g$.

6. The tire rubber composition of claim 1, wherein at least a majority by weight of the at least one rubber comprises natural rubber.

7. The tire rubber composition of claim 1, wherein at least a majority by weight of the at least one rubber comprises polyisoprene.

8. The tire rubber composition of claim 1, wherein at least a majority by weight of the at least one rubber comprises polybutadiene.

9. The tire rubber composition of claim 1, wherein at least a majority by weight of the at least one rubber comprises styrene-butadiene copolymer.

10. The tire rubber composition of claim 9, wherein the styrene-butadiene copolymer is functionalized with a silica-reactive functional group.

11. The tire rubber composition of claim 8, wherein the polybutadiene has a cis-1,4-bond content of at least 92%.

12. A tire rubber composition comprising:
    a. 100 parts of at least one rubber;
    b. at least 5 phr of at least one olefin copolymer viscosity modifier having a Mn of 2,000 to 10,000 grams/mole;
    c. 50 to 200 phr of reinforcing filler comprising a majority amount by weight of silica and a minority amount by weight of carbon black; and
    d. a cure package.

13. The tire rubber composition of claim 12, wherein the silica filler has a BET surface area of 100 to 220 $m^2/g$.

14. The tire rubber composition of claim 12, wherein the silica filler has a BET surface area of 220 to 400 $m^2/g$.

15. The tire rubber composition of claim 12, wherein at least a majority by weight of the at least one rubber comprises natural rubber.

16. The tire rubber composition of claim 12, wherein at least a majority by weight of the at least one rubber comprises polyisoprene.

17. The tire rubber composition of claim 12, wherein at least a majority by weight of the at least one rubber comprises polybutadiene.

18. The tire rubber composition of claim 12, wherein at least a majority by weight of the at least one rubber comprises styrene-butadiene copolymer.

19. The tire rubber composition of claim 18, wherein the styrene-butadiene copolymer is functionalized with a silica-reactive functional group.

20. The tire rubber composition of claim 17, wherein the polybutadiene has a cis-1,4-bond content of at least 92%.

21. A tire comprising a tire tread comprising the tire rubber composition of claim 1.

22. A tire comprising a tire tread comprising the tire rubber composition of claim 12.

* * * * *